United States Patent
Lima et al.

(10) Patent No.: US 7,114,658 B2
(45) Date of Patent: Oct. 3, 2006

(54) INTELLIGENT TRANSPORTABLE MEMORY APPARATUS AND METHOD FOR CHARGING A BATTERY FOR A MEMORY IN AN INTELLIGENT TRANSPORTABLE MEMORY APPARATUS

(75) Inventors: Benny Lima, Snellville, GA (US); Stephen Scott Piper, McDonough, GA (US); Dennis James Craton, Douglasville, GA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 10/961,323

(22) Filed: Oct. 8, 2004

(65) Prior Publication Data
US 2006/0076396 A1    Apr. 13, 2006

(51) Int. Cl.
*G06K 19/06* (2006.01)
(52) U.S. Cl. ...................................................... 235/492
(58) Field of Classification Search ................ 235/492, 235/451, 487, 472.01–472.03
See application file for complete search history.

(56) References Cited

U.S. PATENT DOCUMENTS

| | | | | |
|---|---|---|---|---|
| 5,157,247 A | * | 10/1992 | Takahira | 235/492 |
| 5,625,291 A | * | 4/1997 | Brink et al. | 324/427 |
| 5,950,013 A | * | 9/1999 | Yoshimura et al. | 710/5 |
| 6,557,077 B1 | | 4/2003 | Ghosh et al. | |
| 6,629,198 B1 | * | 9/2003 | Howard et al. | 711/112 |
| 6,697,953 B1 | * | 2/2004 | Collins | 713/320 |
| 6,854,657 B1 | * | 2/2005 | Johnson | 235/492 |

* cited by examiner

*Primary Examiner*—Jared J. Fureman
*Assistant Examiner*—Jamara A. Franklin
(74) *Attorney, Agent, or Firm*—Yee & Associates, P.C.

(57) ABSTRACT

Intelligent transportable data storage component module for a data processing system and a method for charging a battery for a data storage component in an intelligent transportable data storage component module. The intelligent transportable data storage component module has a data storage component and an intelligent battery backup for providing power to the data storage component. The intelligent battery backup, for example, a battery backup falling within Smart Battery Specifications, has a battery and a battery charger that function as a unit to monitor and charge the battery independent of the host processor and firmware of the data processing system and independent of characteristics of the battery.

16 Claims, 6 Drawing Sheets

INTELLIGENT TRANSPORTABLE MEMORY APPARATUS AND METHOD FOR CHARGING A BATTERY FOR A MEMORY IN AN INTELLIGENT TRANSPORTABLE MEMORY APPARATUS

BACKGROUND OF THE INVENTION

1. Technical Field

The present invention is directed generally toward the data processing field and, more particularly, to an intelligent transportable data storage component module for a data processing system and to a method for charging a battery for a data storage component in an intelligent transportable data storage component module.

2. Description of the Related Art

It is known to provide data storage components in a data processing system with a battery backup in order to protect against loss or corruption of data as a result of a power failure. For example, a battery backup has been provided for a cache memory in a computer system to provide emergency power to the cache memory if power to the computer system fails or is otherwise interrupted. Battery backup has also been provided for a RAID (Redundant Array of Independent Disks) storage adapter to protect the adapter in case of power failure.

It is also known to include both a data storage component to be protected and a battery backup for the data storage component in a module in order to provide the data storage component with portability, for example, to enable the component to be transferred from one computer system to another, without losing data. A transportable data storage component together with a battery backup for the transportable data storage component is referred to as a Transportable Battery Backup or TBBU.

Figure 3:
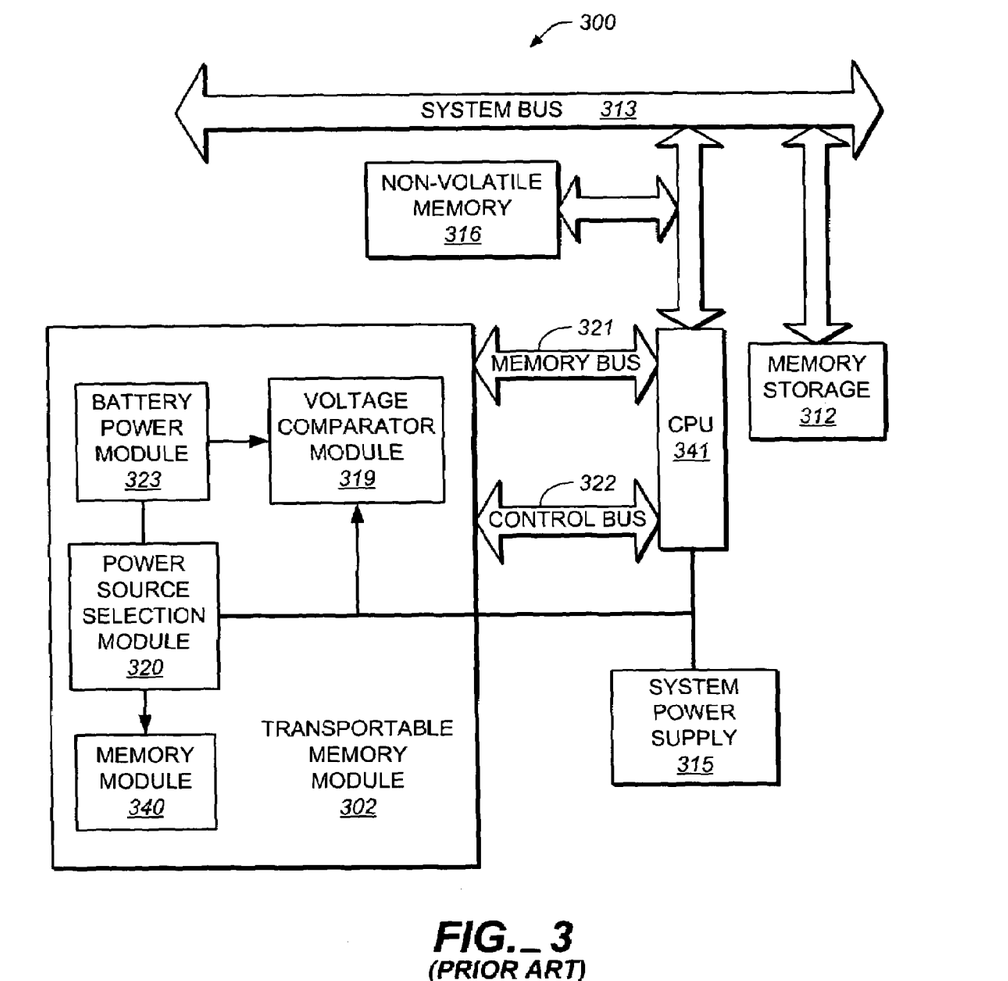
FIG. 3 is a block diagram that illustrates a computer system having a transportable memory module that is known in the art to assist in explaining the present invention.

FIG. 3 is a block diagram that illustrates a computer system having a transportable memory module that is known in the art to assist in explaining the present invention. In particular, FIG. 3 illustrates a computer system that is disclosed in commonly assigned U.S. Pat. No. 6,557,077, the disclosure of which is incorporated herein by reference. The computer system is generally designated by reference number 300, and includes a transportable memory module 302 that includes a cache memory 340. Computer system 300 operates to provide cache memory power source switching functions and memory reconfiguration functions during the activation or powering up of the computer system. For example, auxiliary power may be provided to cache memory 340 in the event that system power supply 315 fails, thereby preserving the integrity of data stored by cache memory 340. If the power failure results from a disruption in the system power supply, the stored data may be downloaded to memory storage device 312, such as one or more disk drives, during the next activation or power up sequence of the computer system after the power disruption has been remedied. Alternatively, if the power failure resulted from a failure within the computer system itself, such as a hardware failure, transportable memory module 302, including cache memory 340, may be transported to another computer system and connected to the other computer system.

Transportable memory module 302 is connected to and in communication with host computer system 300. Host computer system 300 includes central processing unit (CPU) 341; and may also include internal or external memory storage device 312, non-volatile memory 316, power supply 315 and system bus 313 that connects CPU 341 to memory storage device 312.

Transportable memory module 302 is typically connected to host computer system 300 via an adapter slot, another type of expansion slot, or in another manner. As indicated above, however, transportable memory module 302 is transportable, and may be removed from host computer system 300 and installed in another computer system. When connected to host computer system 300, transportable memory module 302 can communicate with CPU 341 via memory bus 321 and control bus 322.

Transportable memory module 302 includes cache memory 340, power source selector 320, voltage comparator 319 and battery 323. These elements may be separate modules, as illustrated in FIG. 3. Power source selector 320 comprises discrete logic that receives information on the state of system power supply 315 and switches cache memory 340 between system power and auxiliary power provided by battery 323 when the system power supply fails.

Voltage comparator 319 comprises discrete logic that senses both the system power level and battery power level and provides power source selector 320 with comparison data.

Figure 4:
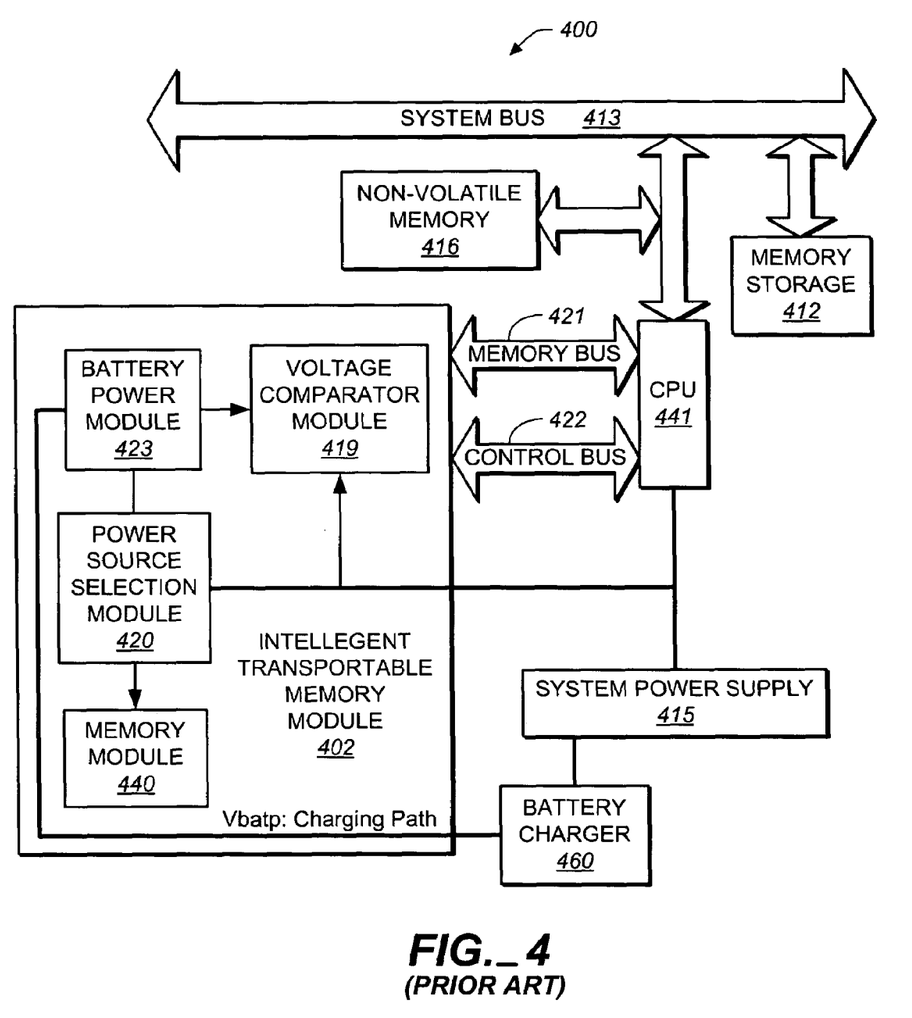
FIG. 4 is a block diagram that illustrates the computer system of FIG. 3 incorporating a battery charger for charging the battery on the transportable memory module in FIG. 3.

In order to charge battery 323 on transportable memory module 302, a battery charging mechanism is required. FIG. 4 is a block diagram that illustrates the computer system of FIG. 3 incorporating a battery charger for charging the battery on the transportable memory module in FIG. 3. The computer system is generally designated by reference number 400, and is similar to computer system 300 in FIG. 3, and corresponding components are identified by corresponding reference numbers.

As shown in FIG. 4, computer system 400 includes battery charger 460 that is connected to battery 423 on transportable memory module 402 and to system power supply 415. As is apparent from FIG. 4, battery charger 460 is separate from transportable memory module 402, and can be used to charge battery 423 only when transportable memory module 402 is connected to host computer 400.

Battery backup applications are typically custom applications designed for a specific battery having a particular number of battery cells and a particular type of battery chemistry. As a result, battery charger 460 must be designed around the number of cells and the battery chemistry of a battery 423. The specific battery design in a TBBU system, accordingly, sets limits on a customer's options with respect to the TBBU system. Among such limitations include:

Battery chemistry dependency. Some battery backup systems are designed around Lithium Ion batteries while other systems utilize NiMH batteries. There is not a one size/one solution/one interface that is able to meet the needs of all customers.

Number of cells within a battery and battery voltage range. Comparator set points must be set so that the data processing system firmware can determine when to charge the battery and when to stop charging the battery. The comparator set points reflect a relative state of charge based upon a related open circuit battery voltage. No specific state of health information is given in relation to the actual capacity of the battery other than a relative voltage of the battery with respect to comparators. If the number of cells in a battery is changed, or if the capacity or chemistry is changed, it is typically necessary to rewrite the firmware to account for the changes in the battery.

Form Factor and Real Estate Constrained.

Common software interface to RAID firmware. In a RAID system, all specific versions of firmware have to gather and interpret the health of the battery from various sources within the RAID adapter.

Must be configured as a factory built option, and typically does not provide an option to be sold as an in-the-field upgrade without substantial overhead costs.

There is, accordingly, a need for an intelligent transportable data storage component module for a data processing system that includes a data storage component and a battery backup for the data storage component that permits a battery of the battery backup to be monitored and charged independent of characteristics of the battery and independent of the host processor and firmware of the data processing system.

SUMMARY OF THE INVENTION

The present invention provides an intelligent transportable data storage component module for a data processing system and a method for charging a battery for a data storage component in an intelligent transportable data storage component module. The intelligent transportable data storage component module has a data storage component and an intelligent battery backup for providing power to the data storage component. The intelligent battery backup, for example, a battery backup falling within Smart Battery Specifications, has a battery and a battery charger that function as a unit to monitor and charge the battery independent of the host processor and firmware of the data processing system and independent of characteristics of the battery.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
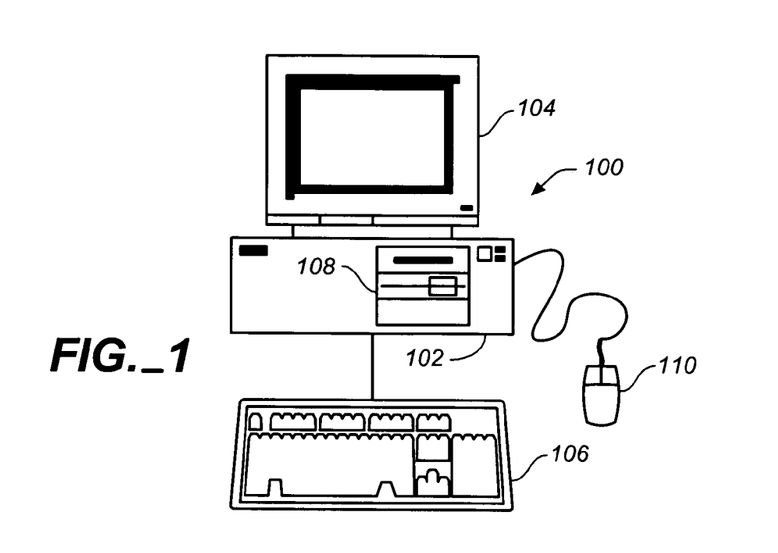
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
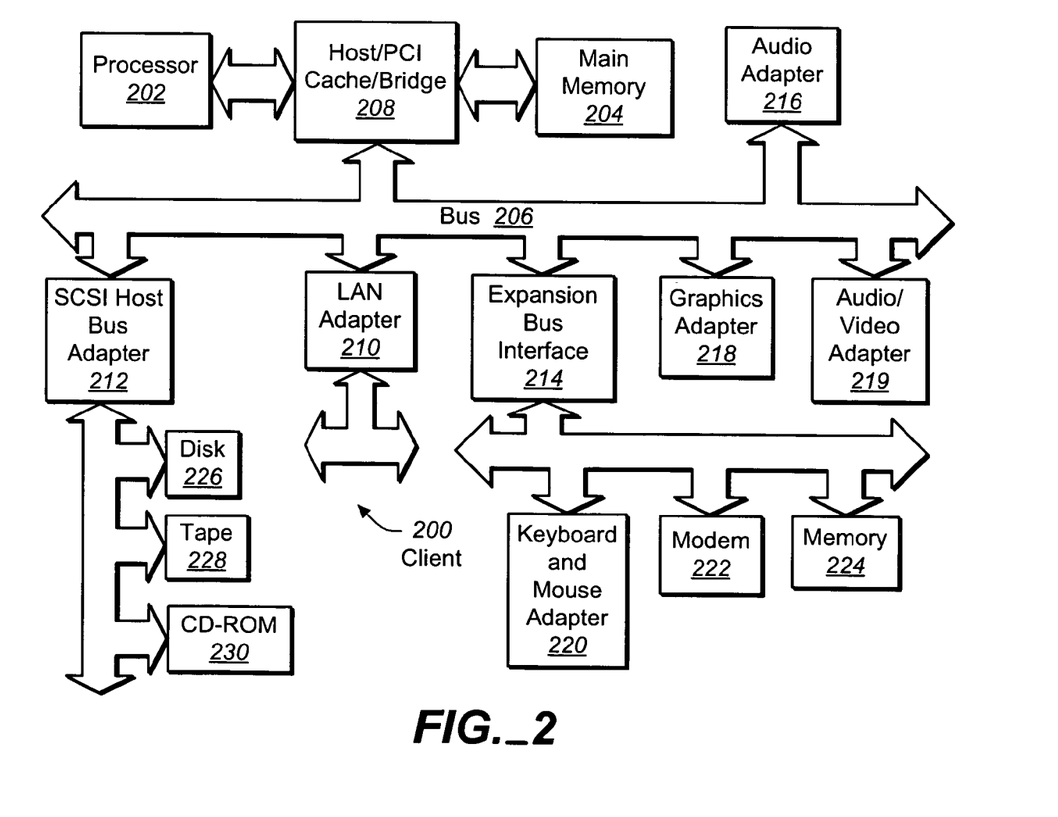
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

Figure 5:
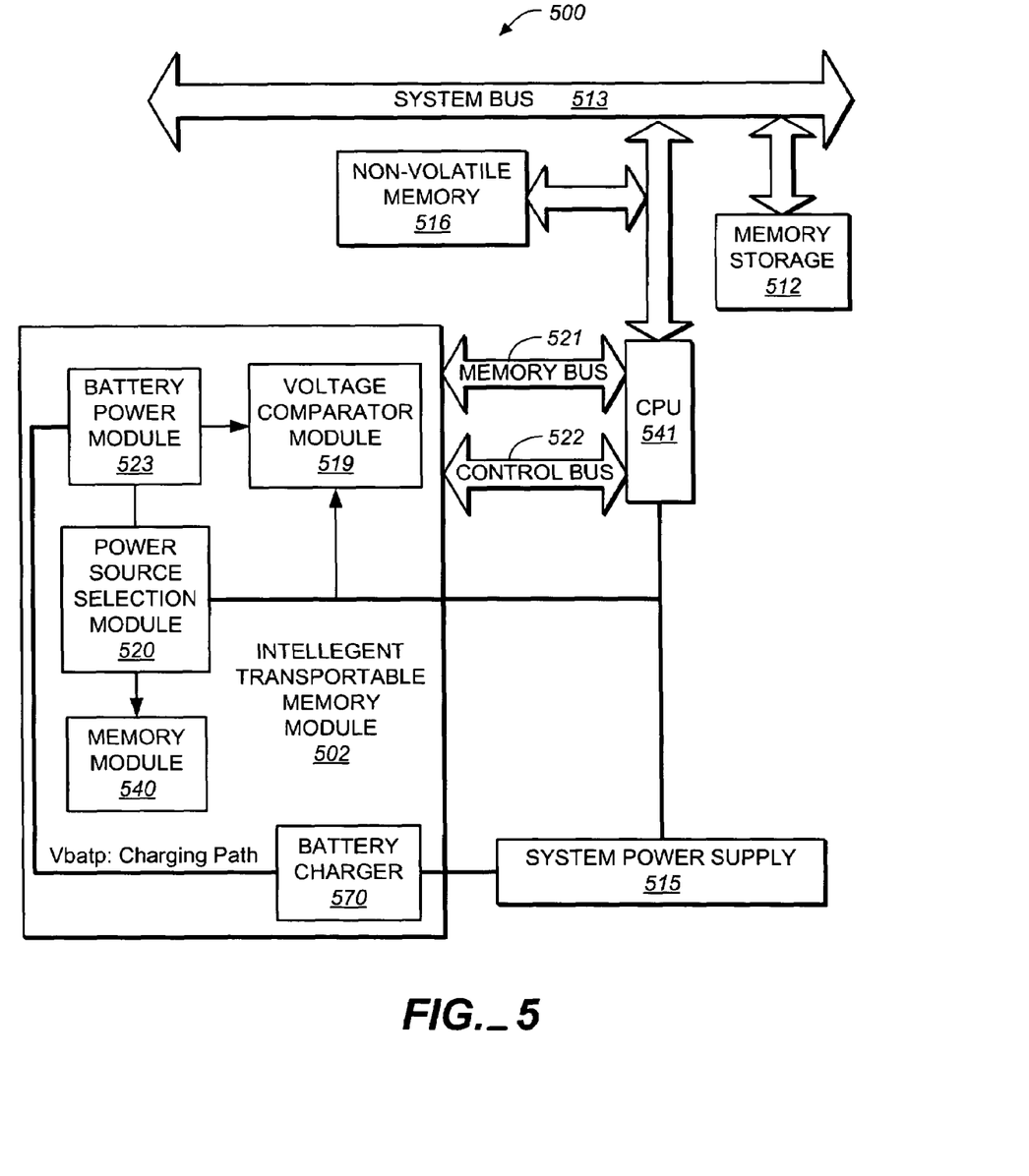
FIG. 5 is a block diagram that illustrates a computer system having an intelligent transportable data storage component module in accordance with a preferred embodiment of the present invention.

FIG. 5 is a block diagram that illustrates a computer system having an intelligent transportable data storage component module in accordance with a preferred embodiment of the present invention. The computer system is generally designated by reference number 500 and is generally similar to computer system 400 illustrated in FIG. 4, and corresponding components are identified by corresponding reference numbers.

Computer system 500 in FIG. 5 differs from computer system 400 in FIG. 4 in that battery charger 570 in system 500 is included on transportable data storage component module 502 together with battery 523. As will be described in detail hereinafter, battery 523 and battery charger 570 comprise an intelligent battery/battery charger combination that performs battery monitoring and charging operations independent of host system 500. As a result, data storage component module 502 comprises an intelligent data storage component module, and battery 523 of intelligent data storage component module 502 can be monitored and charged independent of characteristics of the battery and independent of the host processor and firmware of the data processing system.

Figure 6:
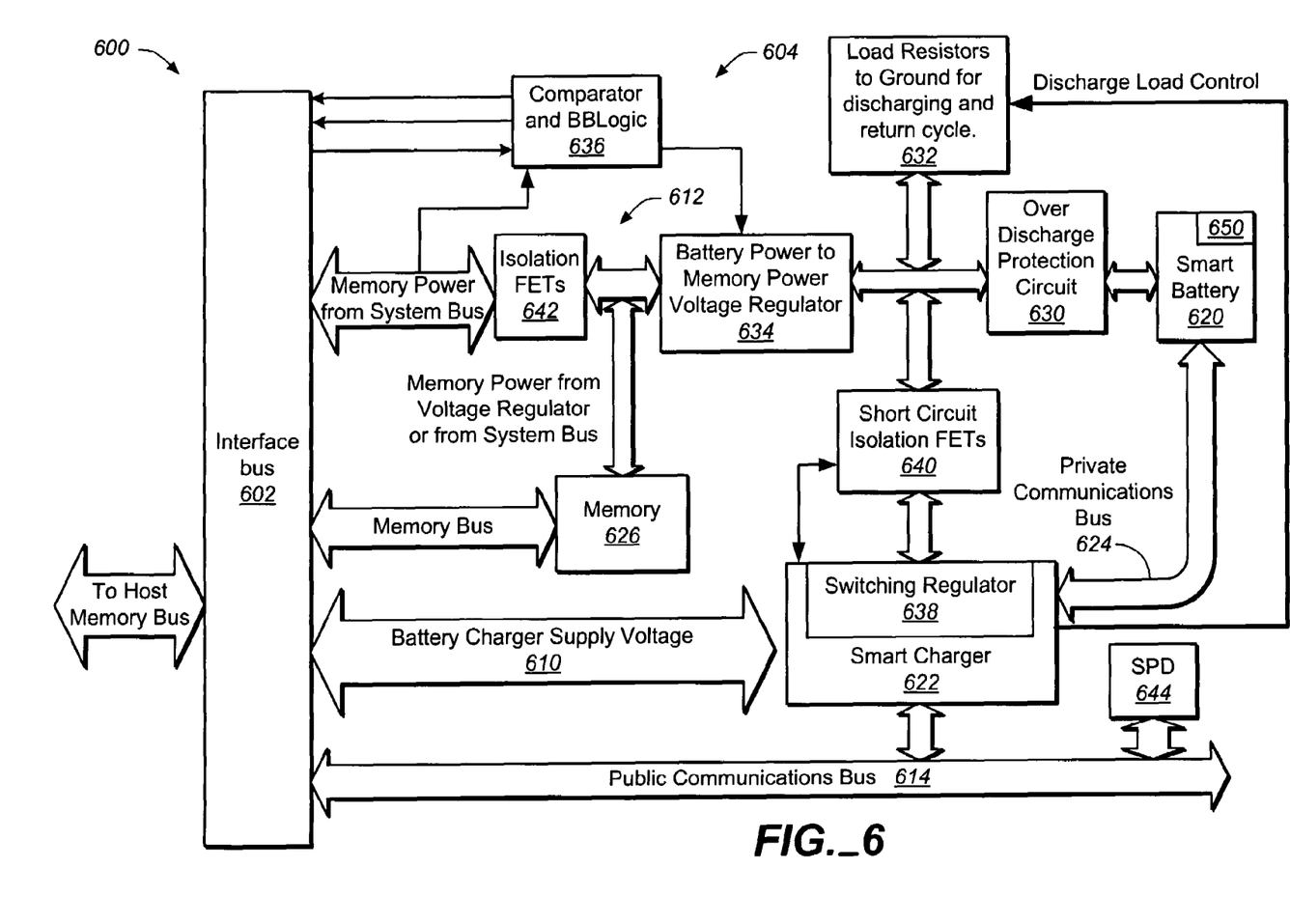
FIG. 6 is a block diagram that illustrates details of the intelligent data storage component module of FIG. 5 in accordance with a preferred embodiment of the present invention.

FIG. 6 is a block diagram that illustrates details of the intelligent transportable data storage component module of FIG. 5 in accordance with a preferred embodiment of the present invention. The transportable data storage component module is generally designated by reference number 600, and includes a data storage component 626. In the preferred embodiment illustrated in FIG. 6, transportable data storage component module 600 comprises a Double Data Rate Memory. It should be understood, however, that the invention is not limited to any particular type of data storage component module or data storage component.

Intelligent transportable data storage component module 600 also includes an intelligent battery backup, generally designated by reference number 604, that functions to provide backup power to data storage component 626 to protect against loss of data stored in data storage component 626 in the event of a power failure of the data processing system; and to provide module 600 with portability so that the module may be moved from one location to another, for example, from one data processing system to another.

Intelligent battery backup 604 includes intelligent battery 620 for storing power to be supplied to data storage component 626, and intelligent battery charger 622 for charging intelligent battery 620. Intelligent battery backup 604 including battery 620 and charger 622 preferably fall within Smart Battery Specifications, although the invention is not limited to any particular type of intelligent battery. Battery 620 and battery charger 622 are preferably connected by private communications bus 624, although it should be understood that both the battery and the charger could utilize the same public communications bus 614, if desired.

Data storage component 626 is connected to battery 620 via power line 612 that includes battery power to memory power voltage regulator line 634 and over discharge protection circuit 630. Data storage component 626 is also connected to the host computer via interface bus 602. Charger 622 is also connected to interface bus 602 by battery charger supply voltage line 610, and to public communications bus 614.

As illustrated in FIG. 6, the battery backup includes various components for monitoring and charging intelligent battery 620 and for protecting data in data storage component 626 from power surges and the like. These various components include over discharge protection circuit 630, load resistors to ground 632 for discharging and return cycle, battery voltage regulator 634 for regulating battery power to memory power, comparator and logic circuit 636 for battery voltage regulator 634, switching MOSFETS/step down regulator 638 for regulating the supply power line down to the battery voltage as a means for charging the battery, short circuit isolation Field Effect Transistors (FETs) 640, and isolation FETs 642 for isolating system power from memory power in case of system power failure. Serial Presence Detector (SPD) 644 is also connected to public communications bus 614 for data storage component identification and configuration.

Charger 622 functions to charge battery 620, and is integrated on data storage component module 600 with battery 620 in order to be able to assume battery charging functions conventionally performed by the host processor and firmware of the data processing system in which the module is incorporated. For example, smart charger 622 is able to determine when and for how long smart battery 620 requires charging, and is able to monitor the capacity of smart battery 620. In particular, battery backup includes a gas gauge 650 to enable the capacity of smart battery 620 to be accurately determined. In prior systems, the host processor and firmware of the data processing system determined battery capacity by making an approximation based on comparators which typically answered only whether the battery was under voltage or over voltage. The under or over voltage only gave an indication by relation of whether the battery pack was FULL or EMPTY, not to the relative state of charge of the battery pack. If the camparators indicated to the firmware that the pack was neither FULL nor EMPTY, the firmware would have no other choice but to charge the battery pack to completion in order to reinitialize the battery pack into a known state. The firmware algorithm then made a judgment call as to whether a battery charging operation should be started, or if a battery being charged has been charging for a sufficient period of time based on ambient temperature characteristics of the battery. The host processor was also required to constantly poll the comparators, in conjunction with the timers, to ensure that the battery was not charged for too long a period of time.

In prior battery backup for data storage component modules, the firmware algorithm was tailored around the number of cells in the battery as well as the voltage range of the battery. If the number of cells in the battery was changed, or if the capacity or the chemistry of the battery was changed, the firmware algorithm had to be rewritten to accommodate the changes. With the present invention, on the other hand, because the smart battery and the smart battery charger are both integrated on data storage component module 600 as a combination smart battery/smart battery charger, transportable data storage component module 600 is able to ensure that it has fully a charged battery in the event that the system power were to fail and it had dirty cache data. In the event of the host system catastrophically failing such that the transportable data storage component would require relocation, the transportable data storage component will have a fully charged battery independent of data processing system firmware, and independent of characteristics of the battery. The transportable battery backup of the present invention can, accordingly, use batteries of NiMH, lithium ion or other chemistries, and can comprise a battery having any suitable number of cells.

Data storage component module 600 in accordance with the present invention permits data processing system firmware to be written simply to support the smart battery/smart charger combination on module 600 and the firmware need not be concerned about specifics of charging or of interpreting the health of the battery. As long as the smart battery/smart charger combination falls within Smart Battery Specifications, the firmware can interact with the combination regardless of battery chemistry or capacity. (This is because all charging responsibilities have been moved to the smart battery/smart battery charger combination and away from the data processing system firmware). The data processing system firmware is now only required to monitor the overall state of health of the battery and charger, and the state of health information is communicated in a common format used in Smart Battery Specifications. In other words, the data processing system firmware must now only query one source, the smart battery/smart battery charger combination.

Data storage component module 600 of the present invention is particularly useful in a RAID (Redundant Array of Independent Discs) system. In a RAID system, specific firmware is typically needed to gather and interpret the health of a battery backup from various sources within the RAID adapter. Inclusion of a smart battery/smart battery charger combination in a RAID system offloads the RAID storage adapter's processor from having to constantly poll and manage the battery and charger. The battery and charger are themselves responsible for charging the battery independent of the onboard processor. The role of the processor becomes simply to gather information from the battery and battery charger and present the information to an end user in a meaningful manner. Because, in the preferred embodiment described herein, the battery and battery charger follow Smart Battery Specifications, the firmware is guaranteed a set of information from the battery and battery charger that conveys to the user the health of the battery in a more useful manner without having to provide layers of interpretation that is dependent upon chemistry/cell count/pack voltage.

It should also be understood that the intelligent battery/intelligent battery charger combination need not fall within Smart Battery Specifications to be able to provide coherent and detailed information regarding the state of health and overall status of the battery. The role of the firmware would not change in that the firmware will still query the combination for the health of the battery.

A data storage component module in accordance with the present invention can be sold to an end customer as a field upgrade without burdening the customer with unused hardware. Currently, a separate daughter card or onboard charger must be mounted on the adapter prior to shipping in the field. This required the customer to pay for a battery charger that may never be used if a transportable battery backup is not required.

Figure 7:
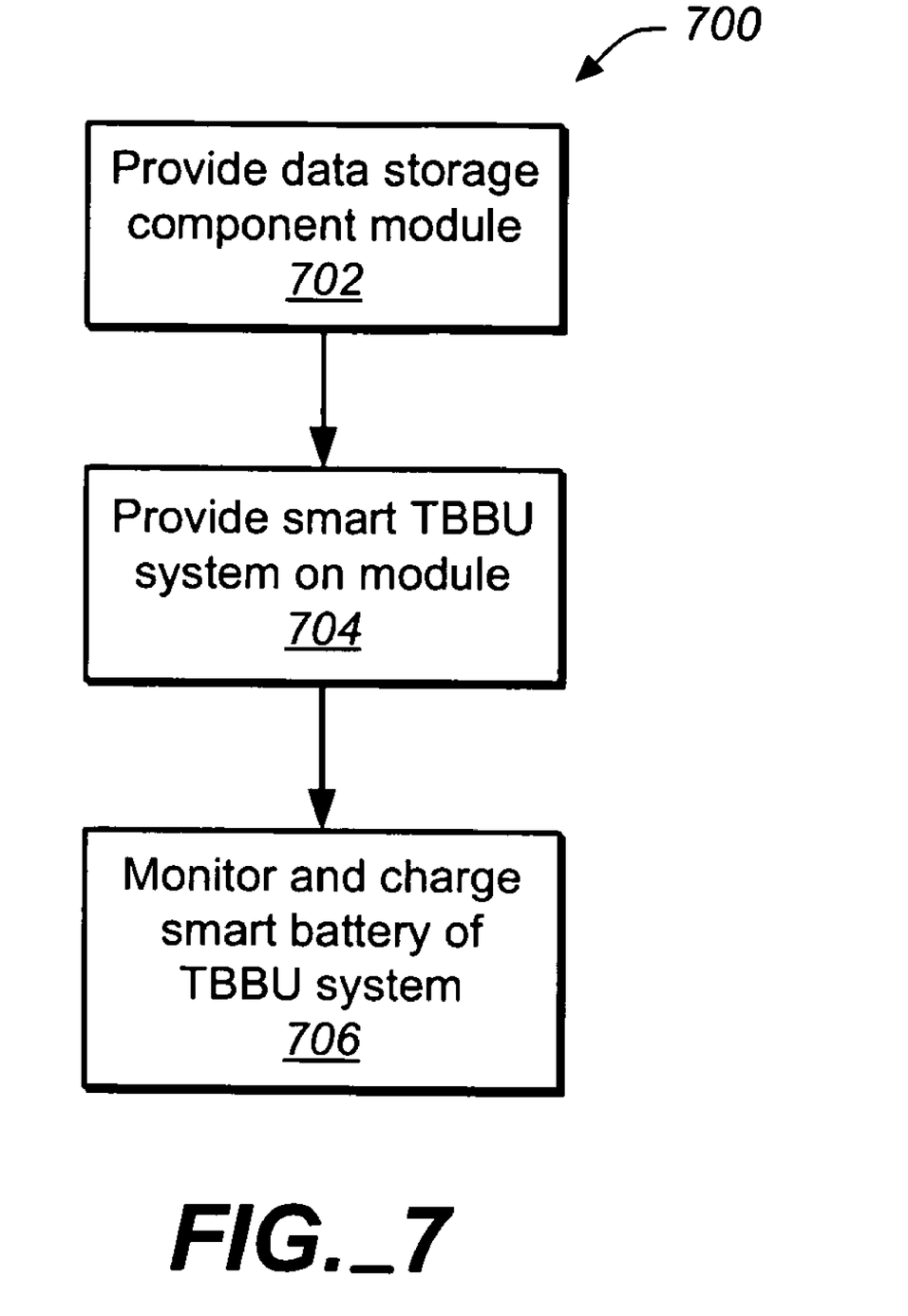
FIG. 7 is a flowchart that illustrates a method for charging a battery for a data storage component of an intelligent transportable data storage component module in accordance with a preferred embodiment of the present invention.

FIG. 7 is a flowchart that illustrates a method, in a data processing system, for charging a battery backup for a data storage component of an intelligent transportable data storage component module in accordance with a preferred embodiment of the present invention. The method is generally designated by reference number 700, and begins by providing an intelligent data storage component module that carries a data storage component (Step 702). A smart transportable battery backup that includes a smart battery/smart battery charger combination is also provided on the data storage component module to provide backup power to the data storage component (Step 704), and the smart battery is then monitored and charged, as needed, using the smart battery/smart battery charger combination independent of the host processor and firmware of the data processing system, and independent of battery characteristics (Step 706).

The present invention thus provides an intelligent data storage component module for a data processing system and a method for charging a battery for a data storage component in an intelligent transportable data storage component module. The intelligent data storage component module has a data storage component and an intelligent battery backup for providing power to the data storage component. The intelligent battery backup, for example, a battery backup falling within Smart Battery Specifications, has a battery and a battery charger that function as a unit to monitor and charge the battery independent of the host processor and firmware of the data processing system and independent of characteristics of the battery.

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application to enable others of ordinary skill in the art to understand the invention for various embodiments with various modifications as are suited to the particular use contemplated.

What is claimed is:

1. An intelligent transportable data storage component module for a data processing system, comprising:
   a data storage component;
   an intelligent battery backup for providing power to the data storage component, wherein the intelligent battery backup comprises a battery and a battery charger for charging the battery and wherein the intelligent battery backup monitors a condition of the battery in the intelligent transportable data storage component; and wherein the battery charger alters charging characteristics of the battery charger to accommodate a change in a type of the battery.

2. The intelligent transportable data storage component module according to claim 1, wherein the intelligent battery backup comprises a battery backup that falls within Smart Battery Specifications.

3. The intelligent transportable data storage component module according to claim 1, wherein the intelligent battery backup includes a battery and a battery charger that fimction as a unit to control charging of the battery.

4. The intelligent transportable data storage component module according to claim 3, wherein the intelligent battery backup further includes a gas gauge for determining a capacity of the battery.

5. The intelligent transportable data storage component module according to claim 3, wherein the intelligent battery backup further includes a private communications bus connecting the battery and the battery charger.

6. The intelligent transportable data storage component module according to claim 3, and further including an interface bus for connecting the intelligent battery backup and the data storage component to the data processing system.

7. The intelligent transportable data storage component module according to claim 1, wherein the intelligent transportable data storage component module comprises a Double Data Rate Memory Module.

8. The intelligent transportable data storage component module according to claim 1, wherein the module is used in a Redundant Array of Independent Discs system.

9. The intelligent transportable data storage component module according to claim 8, wherein the module is on an adapter in a Redundant Array of Independent Discs system.

10. The intelligent transportable data storage component module according to claim 1, wherein the module comprises a field upgrade module.

11. A method, in a data processing system, for charging a battery for a data storage component in an intelligent transportable data storage component module, the method comprising:

providing a transportable data storage component module having a data storage component;

providing an intelligent battery backup on the transportable data storage component module to provide power for the data storage component, the intelligent battery backup comprising a battery and a battery charger for charging the battery;

monitoring a condition of the battery in the intelligent transportable data storage component;

charging the battery using the battery and battery charger; and altering charging characteristics of the battery, charger by battery charger, to accommodate a change in a type of the battery.

12. The method according to claim 11, wherein monitoring a condition of battery comprises:

monitoring the battery with a gas gauge of the intelligent battery backup.

13. The method according to claim 11, wherein the transportable data storage component module comprises a Double Data Rate Memory Module.

14. The method according to claim 11, wherein the transportable data storage component module is used in a Redundant Array of Independent Discs system.

15. The method according to claim 14, wherein the transportable data storage component module is used on an adapter in a Redundant Array of Independent Discs system.

16. The method according to claim 11 wherein the intelligent batttery backup falls within Smart Battery Specifications.

* * * * *